United States Patent
Suenaga et al.

(10) Patent No.: US 6,253,537 B1
(45) Date of Patent: Jul. 3, 2001

(54) REVOLUTION SPEED CONTROL METHOD IN GAS TURBINE SHUTDOWN PROCESS

(75) Inventors: Kiyoshi Suenaga; Yukihiro Hashimoto; Yasuoki Tomita, all of Takasago (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 0 days.

(21) Appl. No.: 09/380,460
(22) PCT Filed: Dec. 28, 1998
(86) PCT No.: PCT/JP98/05988
   § 371 Date: Sep. 3, 1999
   § 102(e) Date: Sep. 3, 1999
(87) PCT Pub. No.: WO99/35384
   PCT Pub. Date: Jul. 15, 1999

(30) Foreign Application Priority Data

Jan. 5, 1998 (JP) .................................................. 10-000186

(51) Int. Cl.$^7$ ............................................................ F02C 7/00
(52) U.S. Cl. ........................................ 60/39.03; 60/39.091
(58) Field of Search .............................. 60/39.03, 39.091, 60/39.13, 39.141, 39.281

(56) References Cited

U.S. PATENT DOCUMENTS 4,201,923 * 5/1980 Reed et al. ........................... 60/39.03

FOREIGN PATENT DOCUMENTS

| 3-71142 | 7/1991 | (JP) . |
| 8-61095 | 3/1996 | (JP) . |
| 08284615 | 10/1996 | (JP) . |
| 9-32583 | 2/1997 | (JP) . |

* cited by examiner

Primary Examiner—Louis J. Casaregola
(74) Attorney, Agent, or Firm—Wenderoth, Lind & Ponack, L.L.P.

(57) ABSTRACT

Stress occurring in a moving blade in a gas turbine stopping process is decreased. Time $t_1$ is load decrease start or fuel throttling start, time $t_2$ is no load operation start, time $t_3$ is fuel shut-off and time $t_4$ is a time of largest stress. A 4/4 load maintained until $t_1$ decreases gradually to a 0/4 load at $t_2$, which is then maintained until $t_3$ and then decreases further. The rotational speed is the rated speed until $t_2$, at which point it is controlled to be decreased gradually to about 60% of the rated rotational speed at $t_3$. The metal differential temperature between a moving blade point A and a platform point B is constant until $t_1$ and is then decreased slightly between $t_1$ and $t_2$ and between $t_2$ and $t_3$. Differential temperature $\Delta t$, largest after $t_3$, occurs at $t_4$. Stress occurring in the moving blade, while decreasing between $t_1$ and $t_3$, becomes largest at $t_4$ by the effect of centrifugal force and thermal stress, but as the rotational speed is decreased to about 60% of the rated rotational speed at $t_3$ and the metal temperature is also decreased as compared with the prior art, the influence of the centrifugal force and the differential temperature is decreased, whereby stress occurring in the moving blade is mitigated.

5 Claims, 3 Drawing Sheets

REVOLUTION SPEED CONTROL METHOD IN GAS TURBINE SHUTDOWN PROCESS

BACKGROUND OF THE INVENTION

1. Field of the Invention

The present invention relates generally to a rotational speed control method in a process for stopping a gas turbine, and specifically to an operational method for controlling a rotational speed in the stopping process so as to avoid excessive stress to be caused in a moving blade.

2. Description of the Prior Art

FIG. 3 is a perspective view of a gas turbine moving blade, wherein numeral 11 designates a moving blade, numeral 12 designates a platform thereof and the moving blade 11 is rotated by a high temperature combustion gas G in a direction R. In such a gas turbine moving blade, operated at a rated rotational speed, when a load decreases to no load and fuel is shut off for a stop of the operation, then excessive thermal stress and centrifugal force arise in the stopping process, as described later, and a crack may occur in the blade.

FIGS. 2 are explanatory views of the transition of the occurrence of stress in the blade in the above mentioned gas turbine stopping process. FIG. 2(a) shows a load state, FIG. 2(b) shows a rotational speed state, FIG. 2(c) shows a metal temperature state and FIG. 2(d) shows the state of stress at the point A of the moving blade 11 of FIG. 3. In FIG. 2(a), a gas turbine is operated with 4/4 load (full load) until time $t_1$, on the time axis. Fuel is throttled starting from the time $t_1$ to time $t_2$, when the load decreases to 0/4 load (no load). A gas turbine rotor is kept rotated in a state of no load until time $t_3$ when the fuel is shut off, and then the load comes to a zero state rapidly.

In FIG. 2(b), corresponding to the load transition of FIG. 2(a), the gas turbine is usually kept operated at a rated rotational speed from the time $t_2$, when the load becomes 0/4, to the time $t_3$, when the fuel is shut off. When the fuel is shut off at the time $t_3$, the rotational speed then decreases rapidly to come to a stop.

In FIG. 2(c), the metal temperature is shown with respect to point A of the moving blade 11 and point B of the platform 12, both shown in FIG. 3. As the high temperature combustion gas flows at a constant rate until the time $t_1$ and likewise the load is the 4/4 load and the rotational speed is the rated speed until this time $t_1$, the metal temperature is kept at a high temperature level. When the load starts to decrease at the time $t_1$, the fuel is then throttled starting from the time $t_1$, and the metal temperature goes down until the time $t_2$ of the 0/4 load to then be kept constant until the time $t_3$ while the state of the 0/4 load continues. As the thermal capacity is larger in the platform 12 than in the moving blade 11, the metal temperature is kept higher at the point B than at the point A until the time $t_3$.

When the fuel is shut off to zero at the time $t_3$, the metal temperature decreases rapidly at both the points A, B. In this process, while the rotational speed also decreases gradually, at time $t_4$, when the rotational speed has not yet decreased sufficiently, the differential temperature between the point A and the point B reaches a maximum, and thereafter the temperatures at the respective points decrease gradually to come to the same final temperature.

FIG. 2(d) shows a state of stress at the point A of the moving blade 11. The stress is constant until the time $t_1$ and then decreases slightly as the load decreases to the time $t_2$ when the load becomes the 0/4 load. Thereafter, even in the state of no load from the time $t_2$ to the time $t_3$, the stress decreases slightly further. However, at the time $t_4$, when the largest differential temperature $\Delta T$ occurs as shown in FIG. 2(c), an excessive thermal stress is generated. In addition to this thermal stress, as the rotational speed still exists to some extent, a centrifugal force in proportion to the rotational speed squared acts. Hence a large force is added to the point A, and a crack may occur, as the case may be, to break the blade.

As mentioned above, in the process oft the gas turbine operated with a full load being decreased in loads so as to be operated with no load, the fuel is shut off and the rotational speed decreases. As the rotational speed does not sufficiently decrease, there occurs a large differential temperature between the moving blade and the platform, and thereby a large thermal stress occurs in the moving blade. Further, in addition to this thermal stress, a centrifugal force in proportion to the rotational speed squared acts. Thus, if such process is repeated, the blade may be broken. There had been no countermeasure in the prior art for preventing the large force acting in the moving blade in this process, and an appropriate countermeasure has been long desired for safety purposes as well.

SUMMARY OF THE INVENTION

In view of the problem in the prior art, it is an object of the present invention to provide a rotational speed control method in a gas turbine stopping process, wherein, in a process that a gas turbine operated at a rated rotational speed is decreased in load to be operated with no load and is then shut off from fuel for stopping operation, a gas turbine rotational speed is controlled to be decreased so that a centrifugal force caused thereby is decreased as well as fuel being throttled so that the differential temperature in a moving blade is made smaller. Thereby the total stress caused by the centrifugal force and the differential temperature is thereby decreased, and breakage of the moving blade can be prevented.

In order to achieve the object, the present invention provides the following.

A rotational speed control method in a gas turbine stopping process comprises a gas turbine operated at a rated rotational speed with a full load being decreased in load gradually so as to be operated with no load. It is then shut off from fuel for stopping of the operation. The rotational speed of the gas turbine is controlled to be decreased at a predetermined rate starting from the time when a power supply from the gas turbine becomes zero while the gas turbine is decreased in load gradually so as to be operated with no load. The rotational speed is further controlled to be decreased to about 60% of the rated rotational speed at the time when the fuel is shut off; then the rotational speed is decreased freely.

In a gas turbine operated at a rated rotational speed with a full load, when fuel is throttled, with the load being decreased gradually to no load, and the fuel is shut off in a no load operation, then, at a point where the rotational speed has not yet been sufficiently decreased in the stopping process, the differential temperature between the moving blade and the platform becomes large, by which an excessive thermal stress occurs. In addition to this thermal stress, the centrifugal force in proportion to the rotational speed squared acts on the moving blade. Thus, a large force is added to the moving blade, and breakage of the moving blade may occur.

In the present invention, therefore, the load is decreased gradually to a no load operation, the gas turbine rotational speed is decreased at a predetermined rate from the rated rotational speed starting from the time when power generation is stopped, for example, when a power supply from the gas turbine becomes zero, or when a generator ceases power generation, and further control is done to decrease the rotational speed to about 60% of the rated rotational speed at the time when the fuel is shut off completely. The level of about 60% of the rated rotational speed is decided in consideration of restrictions of a critical rotational speed in terms of shaft or blade vibration and compressor surge. Thus, the rotational speed is decreased to about 60% of the rated rotational speed at the time when the fuel is so shut off, and thereafter the rotational speed is also lower than that of the prior art case. Hence the centrifugal force, which is proportional to the rotational speed squared, can be decreased greatly as compared with the prior art. Also, as the rotational speed decreases, less fuel is needed and the metal temperature at the time of fuel shut-off can also be decreased as compared with the prior art. As a result of the decreased centrifugal force and the decreased metal temperature, the total stress of caused by the centrifugal force and caused by the differential temperature occurring in the moving blade after the fuel shut-off can be mitigated greatly, there occurs no case of breakage of the moving blade, and the life thereof can be greatly elongated.

BRIEF DESCRIPTION OF THE DRAWINGS

FIGS. 1 are explanatory views of the function of a rotational speed control method in a gas turbine stopping process of an embodiment according to the present invention, wherein FIG. 1(a) shows a state of load in the gas turbine stopping process, FIG. 1(b) shows a rotational speed state, FIG. 1(c) shows a metal temperature state and FIG. 1(d) shows a state of stress occurring in a moving blade.

FIG. 2 are explanatory views of the transition of the occurrence of stress in a moving blade in a gas turbine stopping process in the prior art, wherein FIG. 2(a) shows a load state, FIG. 2(b) shows a of rotational speed state, FIG. 2(c) shows a metal temperature state and FIG. 2(d) shows a state of stress occurring in the moving blade.

DESCRIPTION OF THE PREFERRED EMBODIMENT

Figure 1:
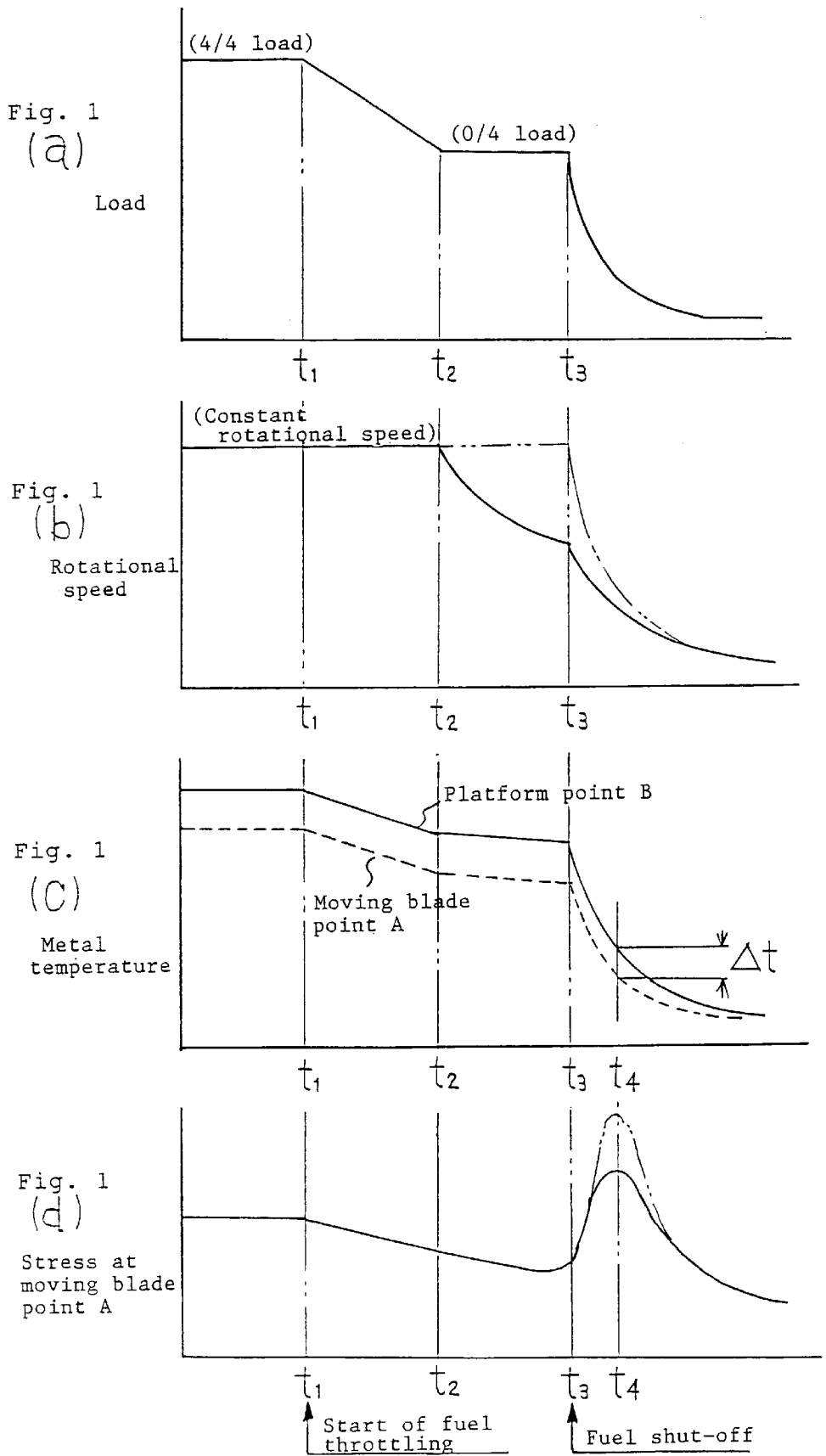

Herebelow, description will be made concretely on an embodiment according to the present invention with reference to FIGS. 1.

Figure 2:
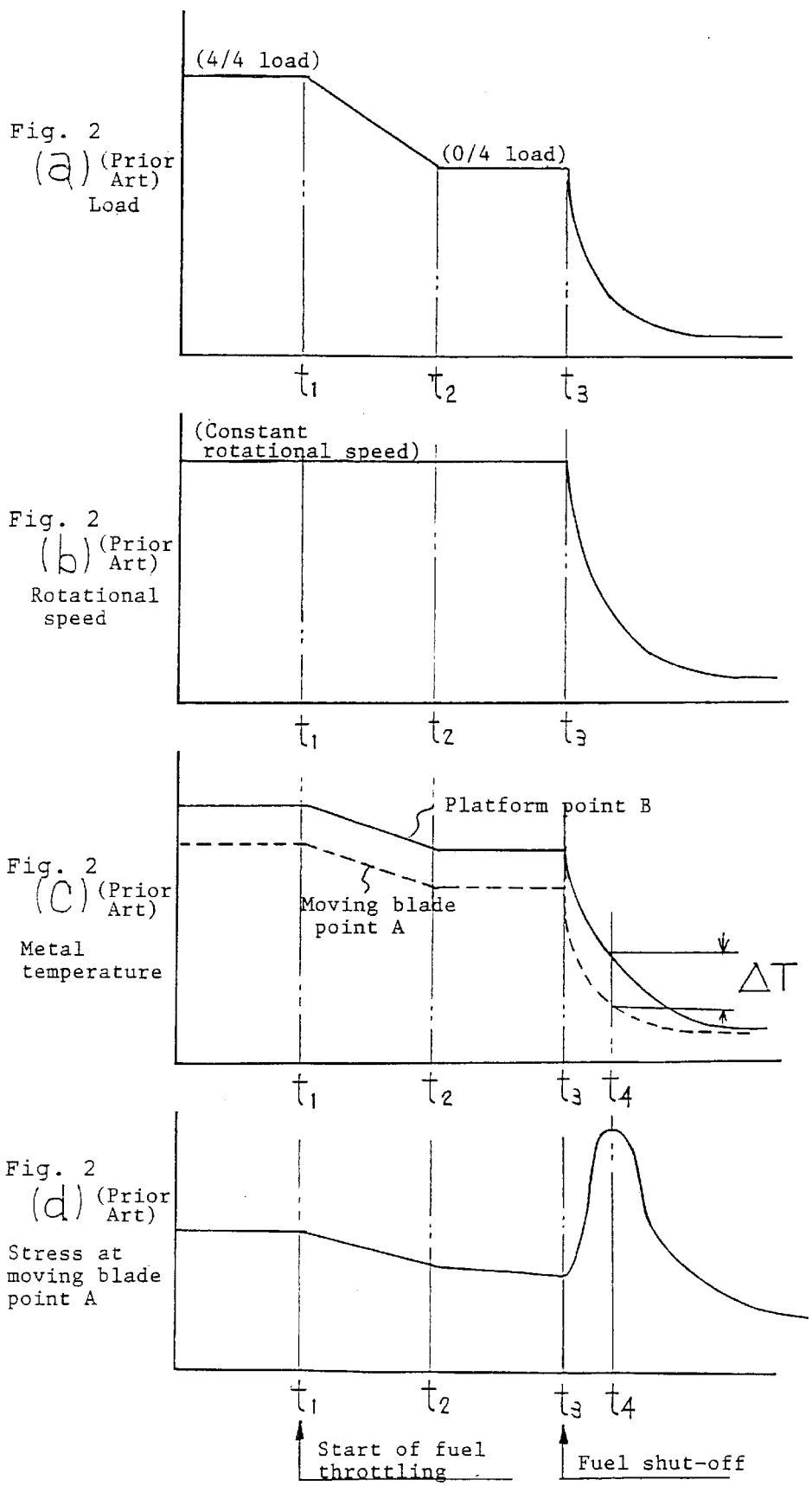
Figure 3:
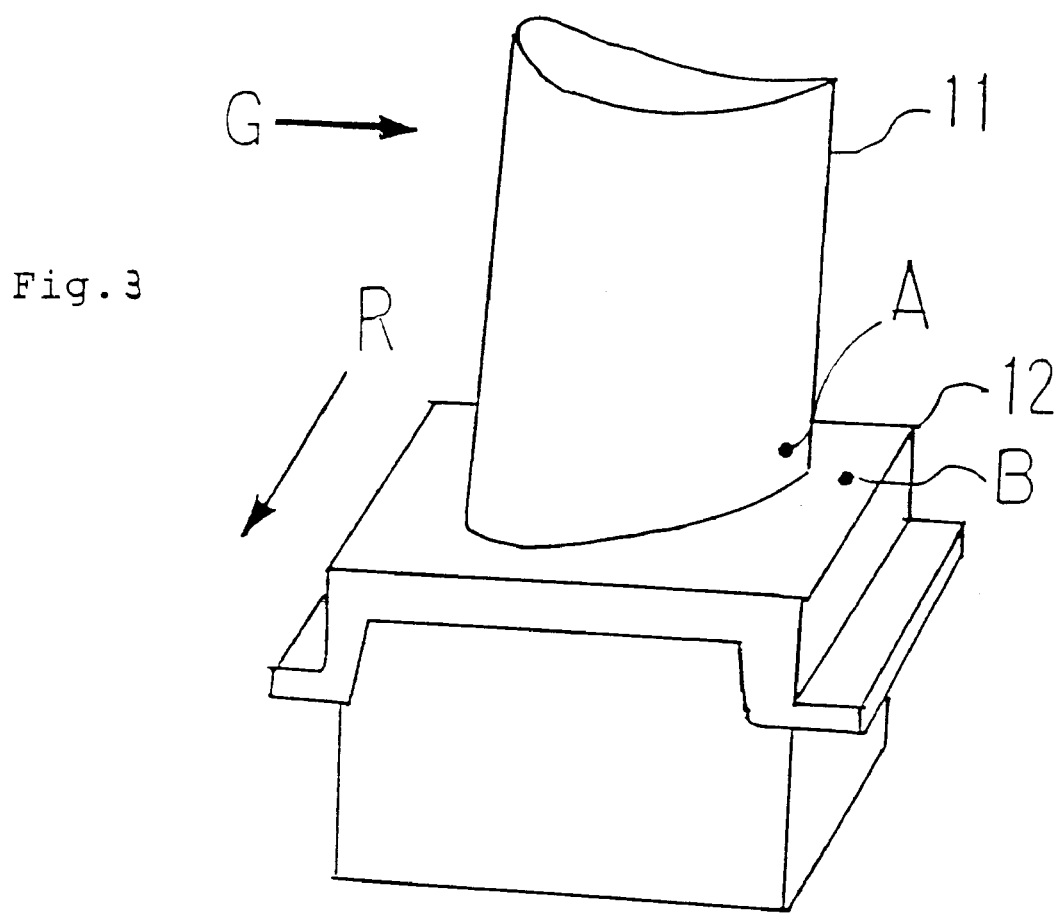
FIG. 3 is a perspective view of a gas turbine moving blade in the prior art.

The load state shown in FIG. 1(a) is the same as that of the prior art shown in FIG. 2(a). That is, the load is 4/4 load (full load) until time $t_1$, and then fuel is throttled to time $t_2$, when the load becomes 0/4 load (no load). The 0/4 load is maintained until time $t_3$, when the fuel is shut off, and then the load decreases rapidly to the zero state.

In FIG. 1(b), until the time $t_2$ when the load becomes the 0/4 load, the gas turbine is in a load state, that is, a generator is in a state of operation, hence the rotational speed is kept constant to a rated rotational speed. From the time $t_2$ to the time $t_3$, while a no load operation is done, the rotational speed at the prior art has been kept constant in the rated rotational speed, but in the present invention, the rotational speed is actively controlled from the time $t_2$ to be decreased to about 60% of the rated rotational speed at the time $t_3$, when the fuel is shut off. At the time $t_3$ and thereafter, the fuel is shut off and the rotational speed decreases rapidly to come to a stop.

In FIG. 1(c), as the thermal capacity is larger in the platform 12 than in the moving blade 11 as mentioned in the prior art case, the metal temperature is kept slightly higher as a whole at the point B than at the point A. The metal temperature is first kept constant until the time $t_1$ while the 4/4 load operation is performed. From the time $t_1$, when the fuel starts to be throttled, until the time $t_2$, when the load becomes the 0/4 load, the metal temperature decreases gradually as in the prior art case.

From the time $t_2$ to the time $t_3$, operation of the 0/4 load (no load) is done with a smaller quantity of fuel and the rotational speed is controlled to be decreased gradually to about 60% of the rated rotational speed, as mentioned with respect to FIG. 1(b). Thus, only the smaller quantity of fuel being needed, the metal temperature becomes slightly lower than the prior art case from the time $t_2$, when the load becomes the 0/4 load, to the time $t_3$, when the fuel is shut off. Because the temperature decrease at this time point leads to a temperature decrease at the next step, it has a large effect.

When the fuel is shut off at the time $t_3$, the metal temperature decrease rapidly at both the points A and B. At time $t_4$ during this temperature decrease, a differential temperature $\Delta t$ between the point A and the point B becomes largest. But as the metal temperature is made slightly lower at the time $t_3$ than with the prior art case, the differential temperature $\Delta t$ at the time $t_4$, which is after the time $t_3$, also becomes smaller than with the prior art case. After the time $t_4$, the metal temperature at both points A and B gradually decreases.

In FIG. 1(d), the stress at the point A of the moving blade 11 is the same as that of the prior art case until the time $t_1$, as well as from the time $t_1$ to the time $t_2$, when the load becomes the 0/4 load, as in the case of the metal temperature. But from the time $t_2$, the operation is controlled to decrease the rotational speed, and the metal temperature is also decreased. Hence the influence both of the centrifugal force and the thermal stress is decreased considerably as compared with the prior art case.

When the fuel is shut off at the time $t_3$, and then both the rotational speed and the metal temperature are decreased, the differential temperature between the point A and the point B becomes largest at the time $t_4$, so that the stress due to the centrifugal force and the thermal stress at the point A becomes largest at this time point. Thereafter, as the rotational speed and the metal temperature go down, the stress also gradually decreases. Because both the rotational speed and the metal temperature are decreased to be lower than those of the prior art case, the largest stress at the time $t_4$ can be made considerably smaller than that of the prior art case, and there occurs no case of breakage of the moving blade.

In decreasing the rotational speed as mentioned above, the rotational speed is is controlled to decrease to about 60% of the rated rotational speed at the time $t_3$ when the fuel is shut off, at which point surge is hardly caused. Thus, as the centrifugal force is proportional to the rotational speed squared, influence of the centrifugal force is decreased greatly to above 0.36, which equals 60% squared, of that in the prior art case. Further, the metal temperature is also decreased slightly, and hence the stress at the point A of the moving blade can be considerably decreased.

According to the rotational speed control method in the gas turbine stopping process of the embodiment of the present invention as described above, the control decreases the rotational speed starting from the time $t_2$ when the gas turbine comes to an operation of 0/4 load and to decrease it gradually to about 60% of the rated rotational speed at the time $t_3$ when the fuel is shut-off. At the same time, the fuel is also gradually decreased, hence in the process from the time $t_3$ of the fuel shut-off until the rotational speed is decreased to come to a stop, the influence of both the centrifugal force and the thermal stress is decreased, and thereby the stress caused at the point A of the moving blade 11 can be generally decreased as much as by about 40%, breakage of the moving blade does not occur, and the life thereof can be elongated by the stress mitigation.

It is understood that the invention is not limited to the particular embodiment described and illustrated herein, but embraces such modified forms thereof as come within the scope of the appended claim.

The rotational speed control method in the gas turbine stopping process of the present invention can mitigate the stress due to both the centrifugal force as well as the thermal stress both occurring in the moving blade in the gas turbine stopping process, whereby breakage of the moving blade can be prevented, which results in a large elongation of the life thereof.

What is claimed is:

1. A gas turbine stopping process, comprising:

gradually decreasing load on a gas turbine operating at a rated rotational speed with a full load until the gas turbine is operating with no load;

shutting off fuel to the gas turbine for stopping the operation of the gas turbine; and controlling rotational speed of the gas turbine such that:
the rotational speed decreases at a predetermined rate starting from when the gas turbine is operating with no load,
the rotational speed of the gas turbine decreases to about 60% of the rated rotational speed by the time said shutting off fuel occurs so as to reduce differential metal temperature in the gas turbine after said shutting off fuel, and
the rotational speed is decreased freely after said shutting off fuel.

2. A gas turbine stopping process, comprising:

gradually decreasing a load on a gas turbine operating at a rated rotational speed with a full load from a time $t_1$ until the gas turbine is operating with no load at a time $t_2$;

shutting off fuel to the gas turbine for stopping the operation of the gas turbine at a time $t_3$ after said time $t_2$; and controlling rotational speed of the gas turbine such that:
the rotational speed decreases starting from when the gas turbine is operating with no load at time $t_2$,
the rotational speed of the gas turbine decreases to about 60% of the rated rotational speed by the time said shutting off fuel occurs at time $t_3$, and
allowing the rotational speed to decrease freely after time $t_3$.

3. The process of claim 2, wherein fuel throttling is started at time $t_1$.

4. The process of claim 2, wherein the rotational speed of the gas turbine is the rated rotational speed until time $t_2$.

5. The process of claim 4, wherein the rotational speed of the gas turbine is decreased at a predetermined rate from time $t_2$ to time $t_3$.

* * * * *